LUDWIG VON BOGDANDY
*INVENTOR.*

United States Patent Office 3,148,050
Patented Sept. 8, 1964

3,148,050
PROCESS FOR THE REDUCTION OF ORES
IN A REACTION FURNACE
Ludwig von Bogdandy, Essen-Frintrop, Germany, assignor to Firma Huttenwerk-Oberhausen A.G., Oberhausen, Germany, a stock corporation of Germany
Filed Nov. 28, 1960, Ser. No. 72,069
Claims priority, application Germany Nov. 27, 1959
3 Claims. (Cl. 75—34)

My present invention relates to a process and a plant for the reduction of ores and more particularly for producing sponge iron from iron ores and reduction gases in a reaction furnace.

One of the main problems in the process of reduction of iron ores and similar minerals without smelting in special reaction furnaces, such as, for instance, cupola furnaces, rotary kilns or cyclone-type reaction chambers, is the low-cost maintenance of a sufficiently high temperature. Heating by outside means is convenient only in the case of smaller furnaces. Partial burning of the reduction gases inside the furnace above the charge is not a satisfactory solution because the arising carbon dioxide and water vapor impede the reaction.

It is, therefore, the general object of my invention to provide a process for the reduction of iron ores in a reaction furnace in an especially simple manner by utilizing reduction gases without any supplementary heating of the gases by liquid or gaseous fuels.

It is a further object of my invention to provide a means for carrying out the above process with optimum utilization of heat.

It is also an object of my invention to provide a highly compact array of reaction chambers adapted to be used for this purpose.

The invention utilizes a regenerative conversion process by which liquid or gaseous hydrocarbons are split and partially oxidized in the presence of preferably incombustible oxygen-containing fluids, such as $O_2$, $H_2O$, $CO_2$ or air, to form mixtures of $H_2$ and CO. These gaseous mixtures need not be purified, as they contain only limited amounts of $CO_2$ of $H_2O$, and by reason of their elevated temperatures (generally above 1000° C.) are very suitable for the reduction process.

The above process for the production of reduction gas has been generally disclosed in copending application Serial No. 10,124, filed February 23, 1960, by Heinz-Dieter Pantke and me. The reduction process according to the present improvement takes place in a reaction furnace connected to two or more regeneratively heated converters operating in alternate cycles with always at least one converter supplying the furnace with reduction gases while the other converter or converters are heated by exhaust gases from the furnace, the exhaust gases being for this purpose enriched with additional air oxygen. The reduction gas supplied by the converters is produced in a two-stage process, the converters being each provided with a first-stage and a heated second-stage reaction chamber. In the first-stage chamber oxygen or an oxygen-containing gas (e.g. air) is mixed in stoichiometric proportions with a fluid rich in hydrocarbons, such as methane, in order to bring about an incomplete combustion of the latter according to the following reaction:

$$4CH_4 + 2O_2 = CO_2 + 2H_2O + 3CH_4 \quad (a)$$

The gas mixture resulting from this reaction is then introduced into a heated second-stage chamber wherein the three remaining moles of hydrocarbons react with the previously formed mole of carbon dioxide and two moles of water vapor according to the equations:

$$CH_4 + CO_2 = 2CO + 2H_2 \quad (b)$$
$$2CH_4 + 2H_2O = 2CO + 6H_2 \quad (c)$$

Thus a reaction gas rich in CO and $H_2$ and containing only negligible amounts of other gases is produced.

The second-stage chamber should be maintained at a temperature of at least 1000° C.–1300° C. for the most efficient operation of the process. Other hydrocarbons, such as propane or butane and liquid hydrocarbons, undergo reactions analogous to that of methane. The amounts of reactive fluids such as oxygen, air, carbon dioxide or water vapor used in the process should be carefully regulated so as not to be in excess of those required for the above reactions whereby the exhaust gases from the reduction furnace can be burned substantially in their entirety in the converter to which they are directed after having reduced the ore. This assures the maximum utilization of all available heat.

In a particularly advantageous embodiment the converters concentrically surround the reaction furnace to afford a minimum overall surface whereby heat losses are reduced to a minimum. Such an arrangement, accordingly, entails a further improvement in the fuel economy of the system.

The above and other objects, features and advantages of my present invention will become more readily apparent from the following description, reference being made to the accompanying drawing in which.

Figure 1:
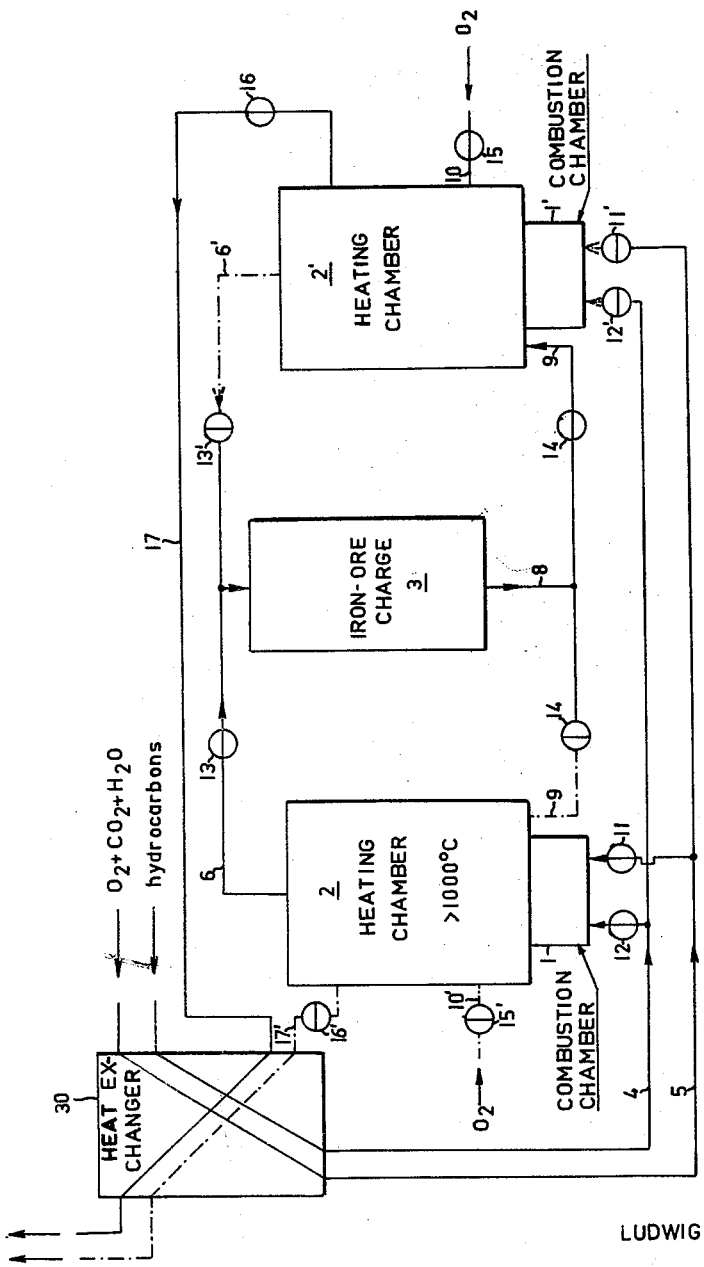
FIG. 1 is a schematic representation of the process.

The apparatus schematically illustrated in FIG. 1 comprises a pair of first-stage reaction chambers 1 and 1' alternately supplied with a hydrocarbon-rich fluid such as, for instance, natural gas or oil. The fluid is led alternately to the combustion chambers 1 and 1' via a conduit 4 provided with control valves 12 and 12'. A conduit 5, provided with control valves 11 and 11', serves to supply hydrocarbon-splitting admixtures such as water vapor, oxygen and/or carbon dioxide (or fluids, such as moist air, containing these admixtures) alternately to the first-stage chambers 1 and 1'. The splitting of the hydrocarbons commences in these first-stage chambers and continues in the regeneratively heated second-stage chambers 2 and 2' where the gas mixture is brought to a temperature above 1000° C., thus further intensifying this process. The resulting gas mixture, predominantly composed of CO and $H_2$, is discharged via a respective conduit 6, 6', controlled respectively by valves 13 and 13', and enters the reduction furnace 3 through a duct 7 which forms a T-junction with conduits 6 and 6'. The reduction furnace 3 contains a charge of iron ore which is reduced by contact with the mixture. Exhaust gases from the furnace 3 are led out via a duct 8 and enter either a conduit 9 or a conduit 9' which are controlled respectively by valves 14 and 14'. The conduits 9 and 9' direct the exhaust gases to the respectively opposite chamber 2' or 2 where these remaining combustible components are burned, thereby heating this chamber. The necessary air or oxygen is fed to the chamber 2 via a pipe 10' controlled by a valve 15' and to chamber 2' via a pipe 10, controlled by a valve 15. After final combustion, the waste gases are discharged from chamber 2 by a pipe 17' controlled by a valve 16' and from chamber 2' by a pipe 17 controlled by a valve 16.

The converters 20 and 20', respectively consisting of chambers 1, 2 and 1', 2', operate in alternate cycles, one converter producing and supplying reduction gases to the furnace while the second converter is being heated by the exhaust gases from the furnace. The process is controlled by the valves which are alternately operated, by a suitable timing mechanism not shown, as follows.

Cycle 1 (solid lines): valves 11, 12, 13, 14, 15, 16 are open; valves 11', 12', 13', 14', 15', 16' are closed.
Cycle 2 (dot-dash lines): valves 11, 12, 13, 14, 15, 16 are closed; valves 11', 12', 13', 14', 15', 16' are open.

Thus, in the first cycle gas or oil from conduit 4 and admixtures from conduit 5 enter the converter 1, where they are transformed to reducing gases and heated to a temperature of more than 1000° C. From chamber 2 these reduction gases enter the reaction furnace 3 where they reduce the ore and whence the burned gases are delivered to chamber 2' and burned with supplemental oxygen to preheat this chamber for the next cycle. Pipe 17 serves as an exhaust pipe.

In the second cycle the process is the same except for an interchange in the functions of the converters.

By suitably proportioning the admixtures that are fed into the converter together with the hydrocarbons it is possible to control the temperature of the heated chamber 2 or 2' so that the heat obtained through complete combustion of the exhaust gases from furnace 3 can be fully utilized. Thus, the conversion of methane and oxygen into carbon monoxide and hydrogen according to the reaction $$CH_4 + \tfrac{1}{2}O_2 = CO + 2H_2 \quad (d)$$

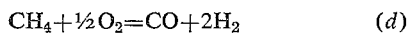

which is a synthesis of reactions (a), (b) and (c), is endothermic and consumes 49.3 kcal./mol, whereas a companion reaction $$CH_4 + H_2O = CO + 3H_2 \quad (e)$$

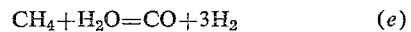

occurring with an excess of water vapor, is exothermic and yields 8.5 kcal./mol. Thus, proper balancing of the quantities of admitted oxygen, water vapor and carbon dioxide (if any) will enable the use of substantially the full calorific value of these exhaust gases in the preheating of the reaction chambers; the residual sensible heat of the gases may then serve to preheat the gases fed into the converters via conduits 4 and 5, e.g. by means of a heat exchanger 30.

Figure 2:
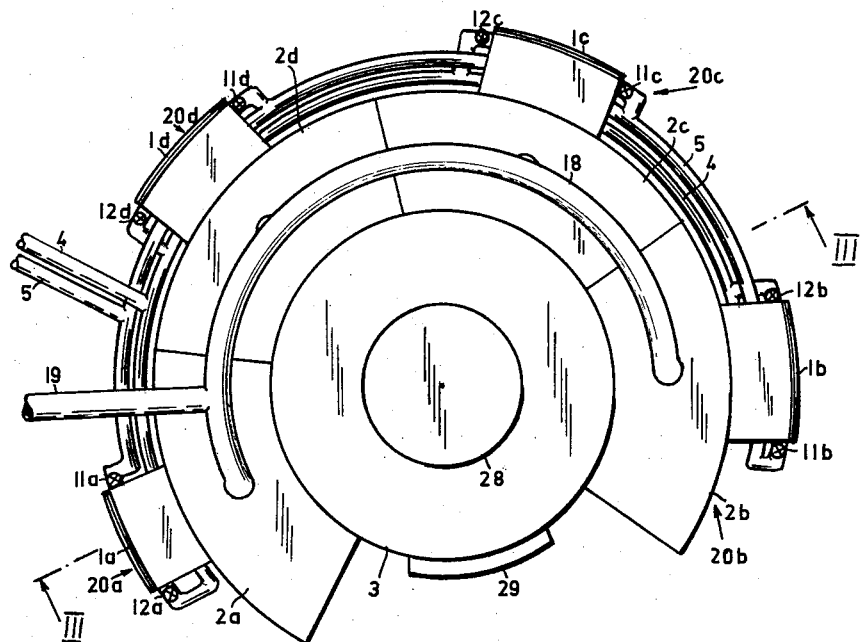
FIGS. 2 and 3 are respectively a top view and a partly cut-away side view of an embodiment of the apparatus according to my invention.
Figure 3:
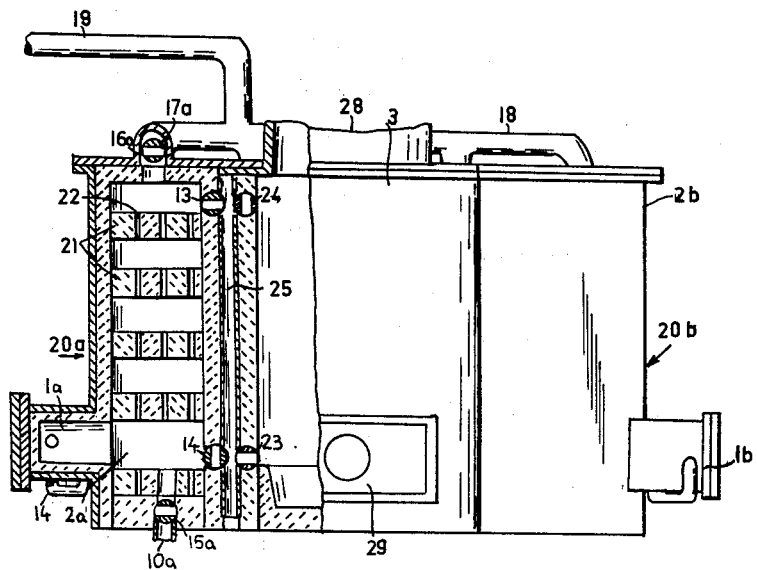

In FIGS. 2 and 3 the ore-reducing apparatus is shown as comprising four converters 20a, 20b, 20c, 20d surrounding the furnace 3 which has the form of a cylindrical chamber. The converters operate in pairs, converters 20a and 20c being simultaneously active in one cycle, by supplying reduction gas to the furnace 3, while converters 20b and 20d are passive in that cycle and are regeneratively heated by exhaust gases from the furnace 3; in the next cycle the process is reversed. The converters, as particularly illustrated for converter 20a in FIG. 3, comprise each a first-stage or combustion chamber 1a to 1d opening into a second-stage or heating chamber 2a to 2d. Pipes 4 and 5, common to all four converters, are controlled respectively by valves 12a to 12d and 11a to 11d to introduce streams of hydrocarbon-rich fluid and oxygen-containing admixtures into the combustion chambers 1a to 1d, where they undergo the primary reaction and whence they enter into the heating chambers 2a to 2d provided with partitions of heat-retaining, refractory ceramic material. The partitions 21 are provided with staggered channels 22 permitting the flow of gas from the heating chamber via a respective pipe 25 to the furnace 3. Each pipe 25 is controlled by valves 13, 23, 14 and 24. In the first cycle valves 13 and 23 are open, valves 14 and 24 are closed, and the reduction gases are led through pipe 25 from the top of the chamber to the bottom of furnace 3. In the second cycle valves 14 and 24 are opened and valves 13 and 23 are closed, thus the exhaust gases from the top part of furnace 3 are admitted to the bottom part of the chamber. The oxygen-supplying pipe 10a, controlled by valve 15a, is placed to enter the chamber 2a from below. The exhaust gases, emerging from chamber 2a through the pipe 17a controlled by valve 16a, are collected in a ring duct 18 with flue 19 which may lead to a heat exchanger such as the one shown at 30 in FIG. 1. The ore is fed into the furnace through a charging door 28 while another door 29 serves for removing the output of sponge iron. It will be seen that heating chambers 2a–2d are in the shape of cylinder segments concentrically surrounding the furnace 3; chambers 2a, 2c and 2b, 2d, which are interleaved around the periphery of the furnace, can be considered as respective sections of two alternately operated chambers such as those shown at 2 and 2' in FIG. 1.

The invention is, of course, not limited to the specific embodiments described and illustrated, it being understood that variations may be made without departing from the scope thereof as defined in the appended claims.

I claim:

1. A process for reducing iron ore, comprising the steps of converting in a first operating cycle a gaseous mixture of a hydrocarbon and air into a reducing gas composed primarily of carbon monoxide and hydrogen at a temperature of substantially 1000° C. to 1300° C. in a first chamber, contacting a charge of said ore with said reducing gas, thereby reducing said ore while partially oxidizing said reducing gas; introducing the resulting partially oxidized gas into a second chamber; burning said partially oxidized gas in said second chamber, thereby heating it to a temperature of substantially 1000° C. to 1300° C.; introducing in a second operating cycle a further gaseous mixture of a hydrocarbon and air into said second chamber and converting said further mixture therein into a further reducing gas composed primarily of hydrogen and oxygen at a temperature of substantially 1000° C. to 1300° C.; contacting said charge with said further reducing gas, thereby reducing said ore while partially oxidizing said further reducing gas; introducing the resulting partially oxidized further gas into said first chamber and burning it therein, thereby heating said first chamber to a temperature of substantially 1000° C., and alternating in the stated manner between said chambers until a desired degree of reduction of said charge is achieved.

2. A metallurgical plant for the reduction of ores, comprising a furnace adapted to receive a charge of ore to be reduced; a first and a second heating chamber; first conduit means including means for forming a gaseous mixture consisting mainly of carbon dioxide, water vapor and hydrocarbons in said first heating chamber, means for delivering a resulting reducing gas from said first heating chamber to said furnace, and means for passing the spent reducing gas from said furnace into said second heating chamber for combustion therein; second conduit means including means for forming a like gaseous mixture in said second heating chamber, means for delivering a resulting reducing gas from said second heating chamber to said furnace, and means for passing the spent reducing gas from said furnace into said first heating chamber for combustion therein; and control means for alternately blocking and unblocking said first and second conduit means whereby each of said chambers is preheated by combustion of spent reducing gas before admission of said gaseous mixture into same, said furnace comprising a cylindrical chamber, said heating chambers being in the shape of cylinder segments concentrically surrounding said cylindrical chamber in heat-exchanging relationship therewith.

3. A metallurgical plant for the reduction of ores, comprising a furnace adapted to receive a charge of ore to be reduced; a first and a second heating chamber; first conduit means including means for forming a gaseous mixture consisting mainly of carbon dioxide, water vapor and hydrocarbons in said first heating chamber, means for delivering a resulting reducing gas from said first heating chamber to said furnace, and means for passing the spent reducing gas from said furnace into said second heating chamber for combustion therein; second conduit means including means for forming a like gaseous mixture in said second heating chamber, means for delivering a resulting reducing gas from said second heating chamber to said furnace, and means for passing the spent reducing gas from said furnace into said first heating chamber for combination therein; and control means for alternately blocking and unblocking said first and second conduit means whereby each of said chambers is preheated by combustion of spent reducing gas before admission of said gaseous mixture into same, said furnace comprising a cylindrical chamber, said heating chambers being in the shape of cylinder segments concentrically surrounding said cylindrical chamber in heat-exchanging relationship therewith, each of said heating chambers being subdivided into a plurality of sections, the sections of said heating chambers being interleaved around the periphery of said cylindrical chamber.

References Cited in the file of this patent

UNITED STATES PATENTS

| | | |
|---|---|---|
| 2,420,398 | Kinney | May 13, 1947 |
| 2,989,396 | Lewis | June 20, 1961 |